US012220712B2

(12) United States Patent

Shiina et al.

(10) Patent No.: US 12,220,712 B2
(45) Date of Patent: Feb. 11, 2025

(54) CENTRIFUGE THAT ADJUSTS THE AMOUNT OF SUPERNATANT LIQUID THAT IS DISCHARGED

(71) Applicant: Eppendorf Himac Technologies Co., Ltd., Ibaraki (JP)

(72) Inventors: Masayuki Shiina, Ibaraki (JP); Hidetaka Osawa, Ibaraki (JP); Ken Asakura, Ibaraki (JP); Hiroshi Hayasaka, Ibaraki (JP)

(73) Assignee: Eppendorf Himac Technologies Co., Ltd., Ibaraki (JP)

( * ) Notice: Subject to any disclaimer, the term of this patent is extended or adjusted under 35 U.S.C. 154(b) by 848 days.

(21) Appl. No.: 17/432,088

(22) PCT Filed: Apr. 24, 2020

(86) PCT No.: PCT/JP2020/017761
§ 371 (c)(1),
(2) Date: Aug. 18, 2021

(87) PCT Pub. No.: WO2020/261744
PCT Pub. Date: Dec. 30, 2020

(65) Prior Publication Data

US 2022/0184639 A1 Jun. 16, 2022

(30) Foreign Application Priority Data

Jun. 27, 2019 (JP) ................................ 2019-119351

(51) Int. Cl.
*B04B 15/12* (2006.01)
*B04B 5/02* (2006.01)
(Continued)

(52) U.S. Cl.
CPC ................ *B04B 15/12* (2013.01); *B04B 5/02* (2013.01); *B04B 5/0421* (2013.01); *B04B 9/10* (2013.01); *B04B 11/04* (2013.01)

(58) Field of Classification Search
CPC ......... B04B 15/12; B04B 5/02; B04B 5/0421; B04B 9/10; B04B 11/04
(Continued)

(56) References Cited

U.S. PATENT DOCUMENTS 3,420,437 A * 1/1969 Blum ..................... C12M 47/12 494/20
3,722,789 A * 3/1973 Kennedy ............... B04B 5/0421 494/20
(Continued)

FOREIGN PATENT DOCUMENTS

CN 101327467 12/2008
CN 104280287 1/2015
(Continued)

OTHER PUBLICATIONS

"International Search Report (Form PCT/ISA/210) of PCT/JP2020/017761," mailed on Jul. 14, 2020, with English translation thereof, pp. 1-4.
(Continued)

*Primary Examiner* — Charles Cooley
(74) *Attorney, Agent, or Firm* — JCIPRNET

(57) ABSTRACT

In a cell washing centrifuge for washing living cells such as blood cells, control of the remaining amount of a supernatant according to the related art greatly depends on controlling the rotation speed of a motor, and thus a highly accurate motor control part is required to prevent overshooting or the like. In place of the related art, an easy control method is required. In the discharging of a supernatant discharge by a centrifuge having a plurality of test tube holders that can
(Continued)

radially swing through centrifugal force, a holding part using an electromagnet that can control the swinging of the test tube holders, and a cleaning liquid distribution element that supplies a cleaning liquid into a test tube, a first decanting operation (③-1) is performed by rotating a rotor in the order of acceleration, settling, and deceleration in a state in which the agitating angle of the test tube is restricted and discharging the supernatant of the cleaning liquid from the test tube, and a second decanting operation (③-2) is performed, at a time of a final decanting operation, by accelerating the rotor, releasing restriction on the agitating angle during the acceleration, and then decelerating the rotor.

15 Claims, 8 Drawing Sheets

(51) Int. Cl.
*B04B 5/04* (2006.01)
*B04B 9/10* (2006.01)
*B04B 11/04* (2006.01)

(58) Field of Classification Search
USPC ...... 494/7–9, 16, 17, 20, 21, 23, 27, 29, 30, 494/31, 33, 36, 60, 72, 37
See application file for complete search history.

(56) References Cited

U.S. PATENT DOCUMENTS 3,877,634 A * 4/1975 Rohde ..................... B04B 13/00 494/20
3,951,334 A * 4/1976 Fleming ................ B04B 5/0421 494/20
3,953,172 A * 4/1976 Shapiro ................. B04B 5/0421 494/20
3,981,438 A * 9/1976 Weyant ................. B04B 5/0421 494/20
4,449,964 A * 5/1984 Westberg .............. B04B 5/0414 494/84
5,045,047 A * 9/1991 Hutchins ................... B04B 9/08 494/20
2003/0216237 A1* 11/2003 Murayama .............. B04B 15/12 494/20
2003/0216238 A1* 11/2003 Yamada .................. B04B 15/12 494/20
2008/0318755 A1* 12/2008 Yamada .................. B04B 15/06 494/9
2022/0184639 A1* 6/2022 Shiina ..................... B04B 15/12
2023/0294113 A1* 9/2023 Sato .......................... B04B 5/04 494/17

FOREIGN PATENT DOCUMENTS

| | | | | | |
|---|---|---|---|---|---|
| CN | 206996866 | | | 2/2018 | |
| CN | 207655329 | | | 7/2018 | |
| JP | 58084063 | A | * | 5/1983 | |
| JP | S60150857 | | | 8/1985 | |
| JP | 63142261 | A | * | 6/1988 | ............. B04B 11/06 |
| JP | 05301060 | A | * | 11/1993 | |
| JP | 2001246292 | | | 9/2001 | |
| JP | 2003334057 | A | * | 11/2003 | ............. B04B 15/06 |
| JP | 2003334468 | A | * | 11/2003 | ............. B04B 15/06 |
| JP | 2003337088 | A | * | 11/2003 | ............. B04B 15/06 |
| JP | 2003337130 | | | 11/2003 | |
| JP | 2006254749 | | | 9/2006 | |
| JP | 2009002777 | | | 1/2009 | |
| JP | 2009153389 | | | 7/2009 | |
| JP | 2009154038 | | | 7/2009 | |

OTHER PUBLICATIONS

"Office Action of Japan Counterpart Application", issued on Jun. 28, 2022, with English translation thereof, p. 1-p. 8.
"Office Action of China Counterpart Application", issued on Aug. 11, 2022, with English translation thereof, pp. 1-13.

* cited by examiner

Functions of each operation mode

Cleaning cycle
Repeat 3 to 4 times (processes ① to ④)

| PROCESS | NAME | STATE |
|---|---|---|
| ① | Cleaning liquid injection step (WASH) |  |
| ② | Centrifugal separation step (CENTRIFUGE) |  |
| ③ | Supernatant discharging step (DECANT) |  |
| ④ | Agitating step (AGITATE) |  |
| ⑤ | Centrifugal separation 2 (CENTRIFUGE) |  |

CENTRIFUGE THAT ADJUSTS THE AMOUNT OF SUPERNATANT LIQUID THAT IS DISCHARGED

CROSS-REFERENCE TO RELATED APPLICATION

This application is a 371 application of the International PCT application serial no. PCT/JP2020/017761, filed on Apr. 24, 2020, which claims the priority benefits of Japan Patent Application No. 2019-119351, filed on Jun. 27, 2019. The entirety of the above-mentioned patent application is hereby incorporated by reference herein and made a part of this specification.

BACKGROUND

Technical Field

The present invention relates to a centrifuge that automatically washes living cells such as blood cells or the like by using centrifugal force, and more particularly to a centrifuge that can precisely adjust the remaining amount of a supernatant discharged from a plurality of test tubes in a supernatant discharging step (remaining amount of decanting).

RELATED ART

In a supernatant discharging step of a conventional cell washing centrifuge, a test tube holder is sucked by a magnetic device, a test tube is rotated while being held in a substantially perpendicular direction, and the supernatant in the test tube is discharged by a centrifugal force. A technique of Patent literature 1 is known as this cell washing centrifuge that discharges a supernatant. In Patent literature 1, the cell washing centrifuge includes: a plurality of test tube holders that are rotatably mounted on a rotor in a circular row and rotated in an outer horizontal direction of the circular row by a centrifugal force generated by the rotation of the rotor; a cleaning liquid distribution element that supplies a cleaning liquid into a plurality of test tubes that are mounted on the inner side of the rotor; and a magnetic element (holding part) that sucks the test tube holder vertically or at a nearly vertical angle by a magnetic attraction force generated by energization of a magnetic coil. The cleaning liquid distribution element has a nozzle (cleaning liquid injection port) installed radially from the outer periphery of a bottom surface of a container whose inner surface has a conical shape, and the cleaning liquid distribution element uniformly divides the cleaning liquid injected by the centrifugal force from the center of the cleaning liquid distribution element that rotates with the rotor, and supplies the cleaning liquid into the plurality of test tubes held by the test tube holders through the nozzle. A cleaning process of the cell washing centrifuge, including a cleaning liquid injection step, a centrifuging step, a supernatant discharging step, and an agitating step, is automatically performed in sequence. Of these, in the supernatant discharging step, the test tube holder is held on the rotor by the magnetic element in a state of being tilted outward at a small angle from the vertical direction, and the rotor is rotated at a low and constant speed. Thereby, the supernatant of the cleaning liquid is discharged from an upper opening of the test tube by the centrifugal force.

LITERATURE OF RELATED ART

Patent Literature

Patent literature 1: Japanese Patent Laid-Open No. 2009-2777

SUMMARY

Problems to be Solved

In the supernatant discharging step of the conventional cell washing centrifuge, the test tube holder is sucked to hold the test tube in a substantially vertical state, and the supernatant in the test tube is discharged by the centrifugal force when the rotor is accelerated and settled. Thus, the discharge amount of the supernatant is determined by a rotation speed when the rotor is settled and a centrifugal time including an acceleration time. In this way, the conventional supernatant discharge control depends greatly on the rotation speed control of the motor, and thus a highly accurate motor control technique such as a technique that does not overshoot the rotation speed at the time of settling or the like is required. In addition, after the supernatant discharging step is completed, it is difficult to remain the cleaning liquid in the test tube in an amount desired by a user, that is, it is difficult to finely control the discharge amount of the supernatant.

The present invention has been made in view of the above background, and an object of the present invention is to provide a centrifuge that can precisely control the discharge amount of a supernatant. Another object of the present invention is to provide a centrifuge that performs a first decanting operation in which a supernatant discharging step is performed in a state that a test tube holder is sucked, and a second decanting operation in which the test tube holder is made to swing by releasing the suction state of the test tube holder using a holding part during rotation of a rotor. Still another object of the present invention is to provide a centrifuge that can adjust the amount of a cleaning liquid remaining in a test tube by moving a timing for releasing the suction of a test tube holder during the supernatant discharging step (during the rotation of the rotor).

Means to Solve Problems

Typical features of the invention disclosed in the present application are described as follows. According to one feature of the present invention, a cell washing centrifuge includes: a motor; a rotor that is mounted on a drive shaft of the motor; a plurality of test tube holders that are arranged side by side in a circumferential direction of the rotor and are rotatable (can agitate) in a radial direction by a centrifugal force generated by the rotation of the rotor; a cleaning liquid distribution element that is held in the rotor and supplies a cleaning liquid into a plurality of test tubes held by the test tube holders; a holding part capable of preventing the rotation of the test tube holder; and a control device for controlling rotation of the motor and the operation of the holding part. In the cell washing centrifuge, the control device performs the following steps: a cleaning liquid injection step of injecting the cleaning liquid into the test tube by the cleaning liquid distribution element during the rotation of the rotor; a centrifuging step of rotating the test tube holders by the centrifugal force generated by the rotation of the rotor; and a supernatant discharging step of rotating the rotor in a state in which the test tube holders are held by the holding part and discharging the supernatant of the cleaning liquid from the test tube. In the supernatant discharging step, during the rotation of the rotor, particularly, during the acceleration of the rotor, by releasing the holding state of the test tube holders held by the holding part, the test tube holders can be made to swing from the fixed state and the discharge of the supernatant can be stopped halfway. In this way, in the present invention, the amount of the supernatant remaining in the test tube can be adjusted according to a timing for releasing the test tube holders from the holding state.

According to another feature of the present invention, the supernatant discharging step includes control of "acceleration, settling, and deceleration" of the rotor. Furthermore, when the holding of the test tube holders by the holding part is released during the acceleration of the rotor, the rotation of the rotor is controlled to be decelerated without being settled thereafter. When the holding of the test tube holders are released during the acceleration of the rotor, the amount of the cleaning liquid remaining in the test tube can be adjusted according to the rotation speed of the rotor when the holding of the test tube holders are released. With this configuration, the residual amount of the cleaning liquid can be adjusted to an amount desired by the user by changing the timing for releasing the holding of the test tube holders back and forth. The holding part includes an electromagnet, and the control device fixes (prevent swinging of) the test tube holders by sucking the test tube holders which includes a magnetic material by the electromagnet. With this configuration, the suction or the release of the test tube holders can be easily controlled according to an electric signal from the control device. Furthermore, a stopper that restricts the agitating angle of the test tube holders with respect to the drive shaft during the centrifugation is formed on the rotor, and a maximum agitating angle during the centrifugal separation operation is constant.

According to still another feature of the present invention, a centrifuge includes: a rotor rotated by a motor; a cleaning liquid distribution element that injects a cleaning liquid into a test tube mounted on the rotor during the rotation of the rotor; an agitating angle changing part that can switch the agitating angle of the test tube with respect to the rotor; and a control device for controlling the rotation of the motor, the injection of the cleaning liquid, and the change of the agitating angle. The control device performs two types of decanting operations. In a first decanting operation, the rotor is rotated in the order of "acceleration, settling, and deceleration" in a state that the agitating angle of the test tube is restricted, and the supernatant of the cleaning liquid is discharged from the test tube. In a second decanting operation, the rotor is accelerated, the restriction on the agitating angle is released during the acceleration, and then the rotor is decelerated. That is, the second decanting operation does not include the "settling" operation of the rotor. The amount of the cleaning liquid remaining in the test tube after the second decanting operation can be easily adjusted according to the switching timing of the agitating angle during the acceleration of the rotor. The second decanting operation is performed after the first decanting operation, and is preferably performed as the final decanting operation. Furthermore, a switching timing of the agitating angle during the second decanting operation can be set in advance by the user, and thus the user can freely set the amount of the cleaning liquid remaining in the test tube.

Effect

According to the present invention, the amount of the supernatant discharged from the test tube (decant amount) can be controlled by adjusting the timing for releasing the suction of the test tube holders in the supernatant discharging step, that is, the rotation speed at the time of releasing the suction. In particular, different from the conventional adjustment of the decant amount which is performed by agitating (swinging) the test tube holders during the acceleration of the rotation of the rotor and depends on the rotation speed at the time of the settling and the time, the decant amount can be precisely adjusted by the control device 10. Furthermore, in the conventional control, the remaining amount of the supernatant after decanting is precisely remained only in a small amount (less than 1 mL), but in this method, by freely changing the timing for releasing the suction, the remaining amount of the supernatant after decanting can be precisely remained even in a large amount (1 mL or more).

Figure 3:
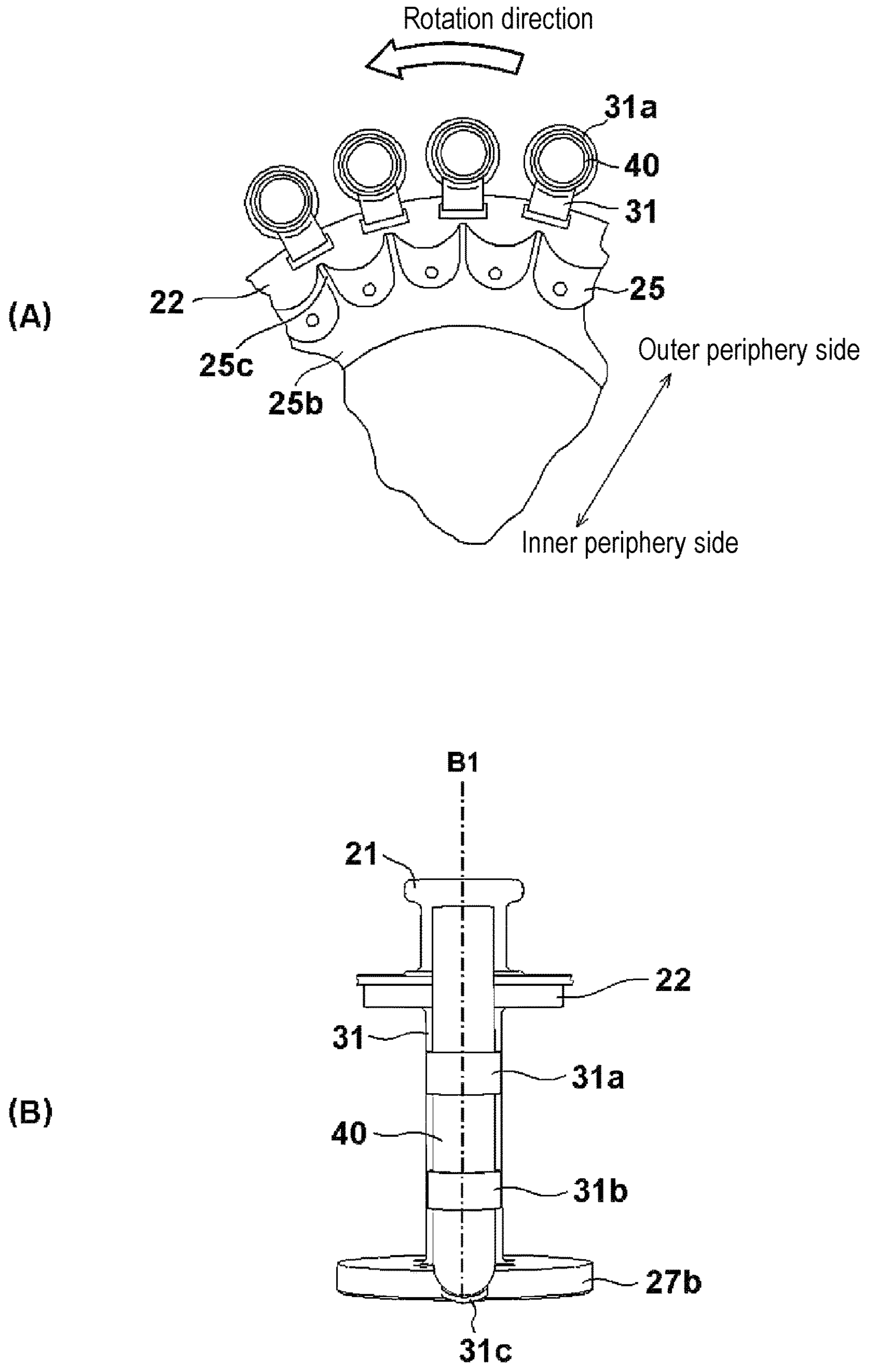

(A) of FIG. 3 is a partial top view of the test tube holder 31 having a test tube 40 mounted thereon, and (B) of FIG. 3 is a partial side view of the test tube holder 31 having the test tube 40 mounted thereon (stationary state).

Figure 4:
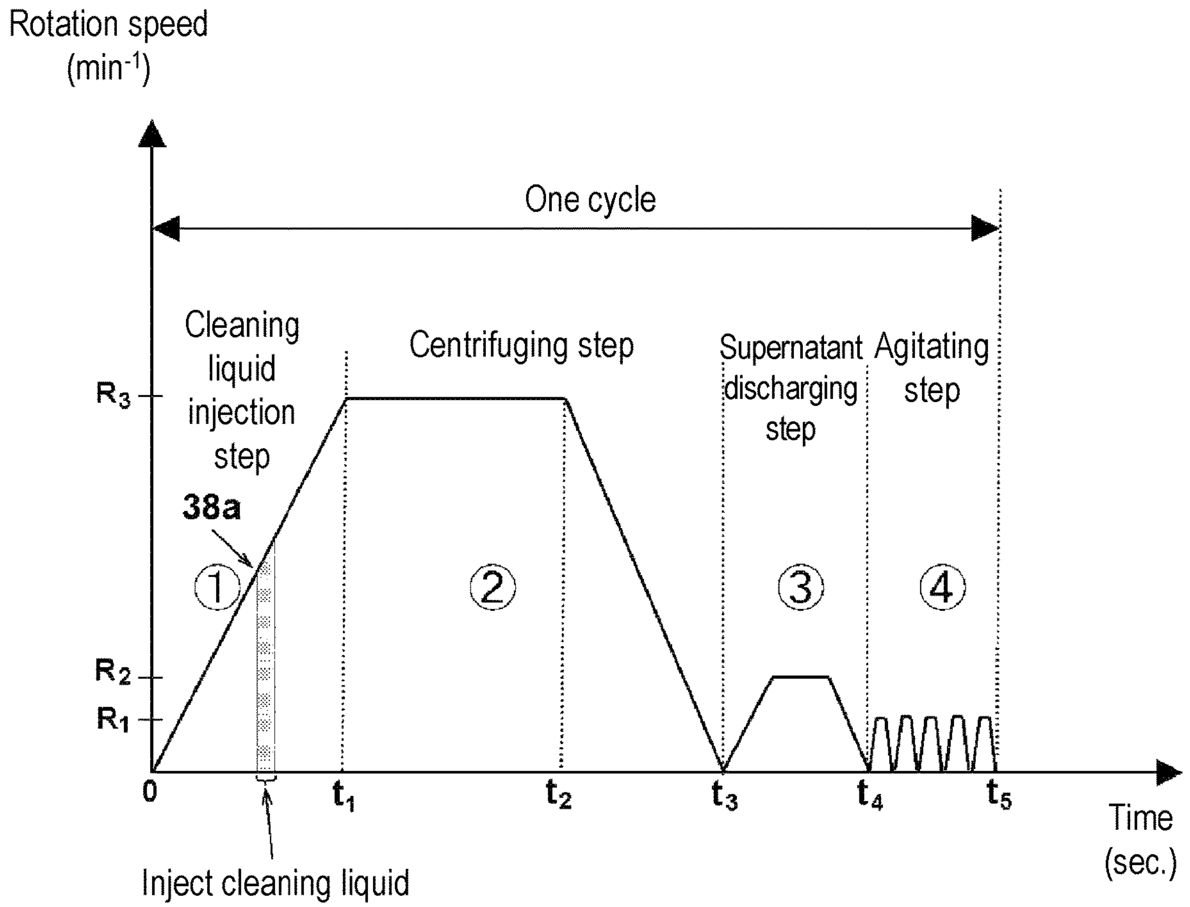

FIG. 4 is a time chart showing a rotation speed of the rotor 20 in a cleaning cycle.

Figure 5:
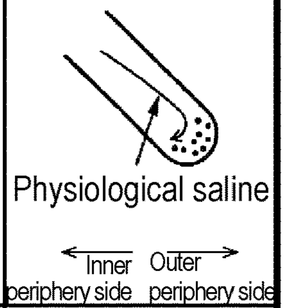
Figure 5:
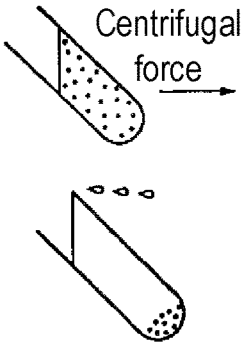
Figure 5:
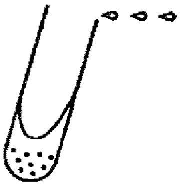
Figure 5:
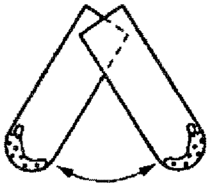
Figure 5:
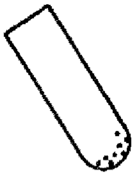

FIG. 5 is a diagram showing each process and each state of the test tube 40 in the cleaning cycle.

Figure 6:
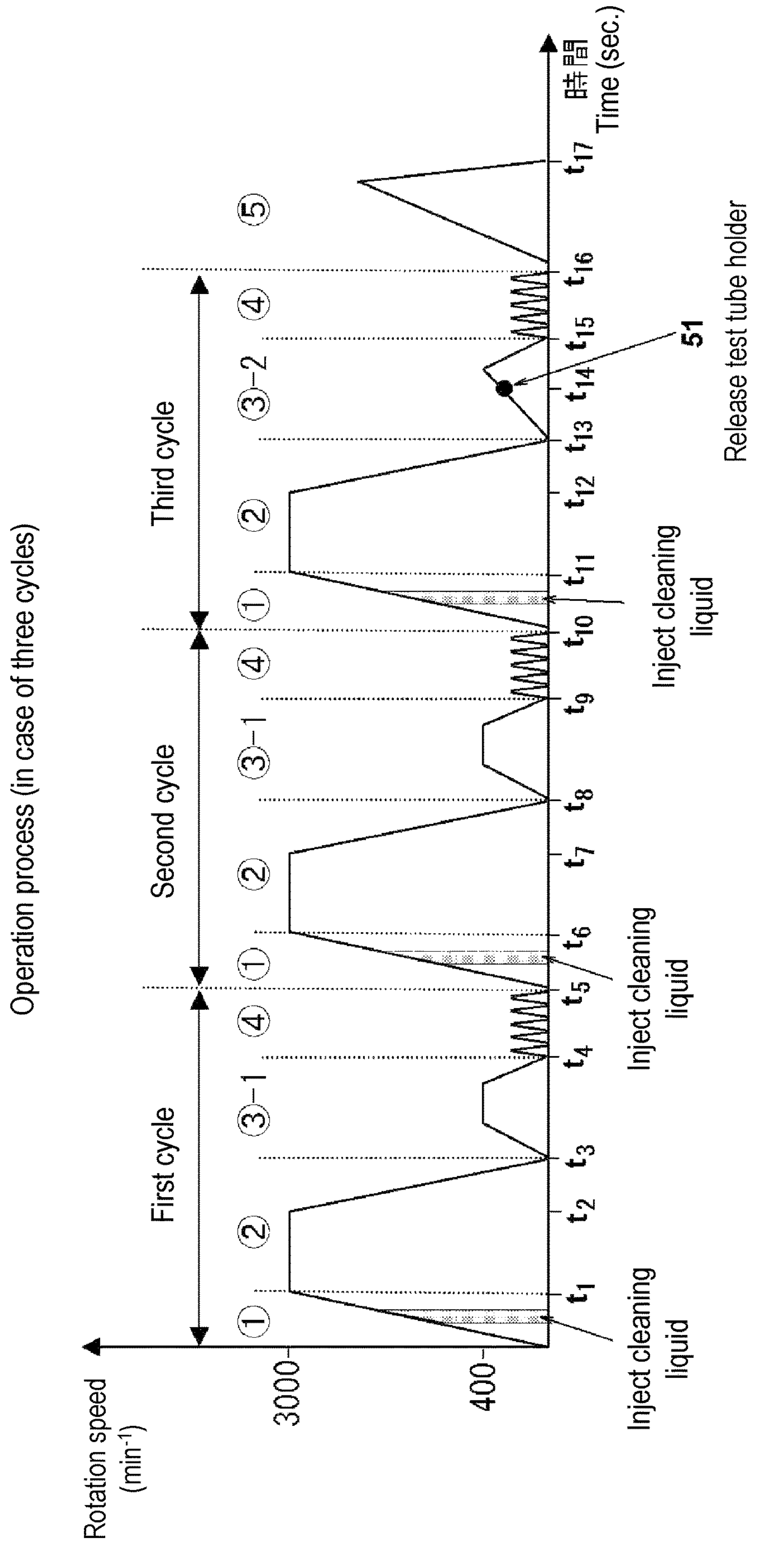

FIG. 6 is a time chart showing a rotating state of the rotor 20 during performing of a living cell washing process performed by the centrifuge according to the embodiment when a blood transfusion test or the like is performed.

Figure 7:
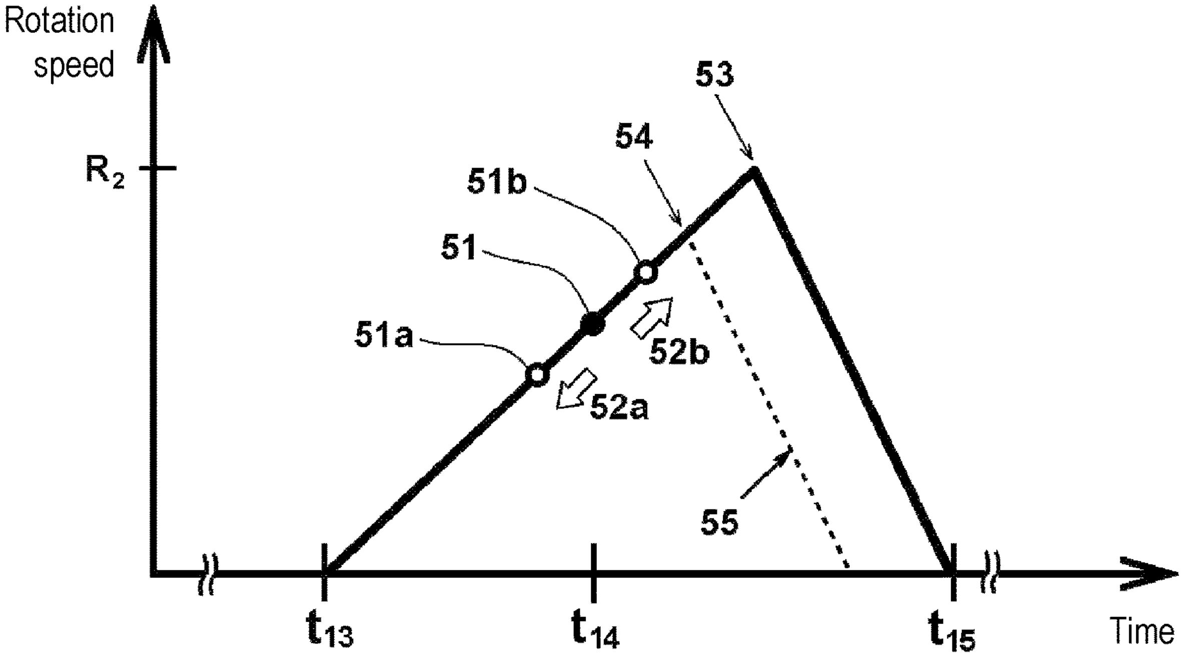

FIG. 7 is a diagram in which the portion of a supernatant discharging step (a portion from time $t_{13}$ to time $t_{15}$) shown in ③-2 of FIG. 6 is extracted.

Figure 8:
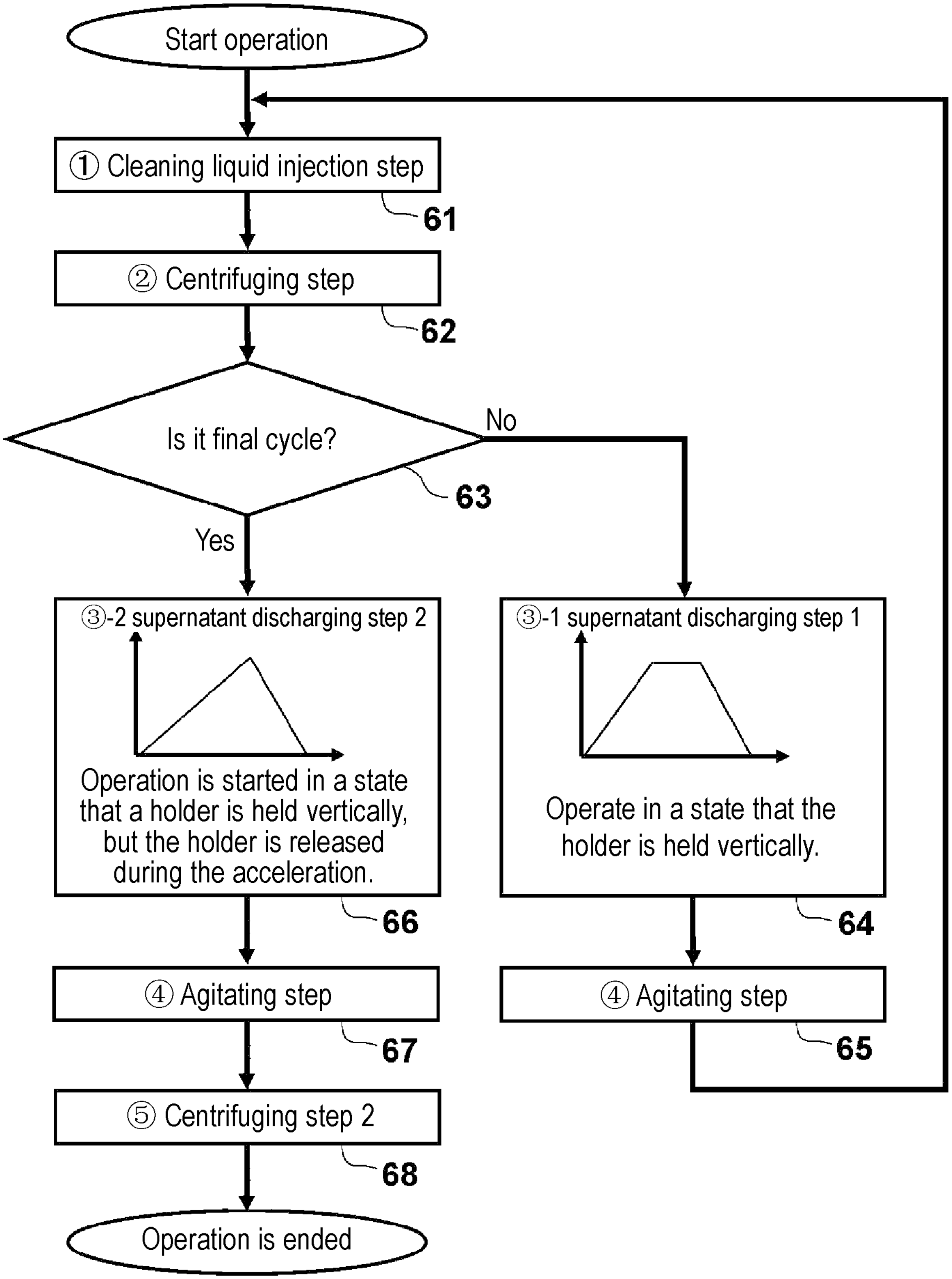

FIG. 8 is a flowchart showing an overall procedure of the living cell washing process according to the embodiment when the blood transfusion test or the like is performed.

DESCRIPTION OF THE EMBODIMENTS

Embodiment 1

Hereinafter, an embodiment of the present invention is described in detail with reference to the drawings. Note that, in all the diagrams for describing the embodiment, the members having the same function are designated by the same reference signs, and the repeated description thereof is omitted.

Figure 1:
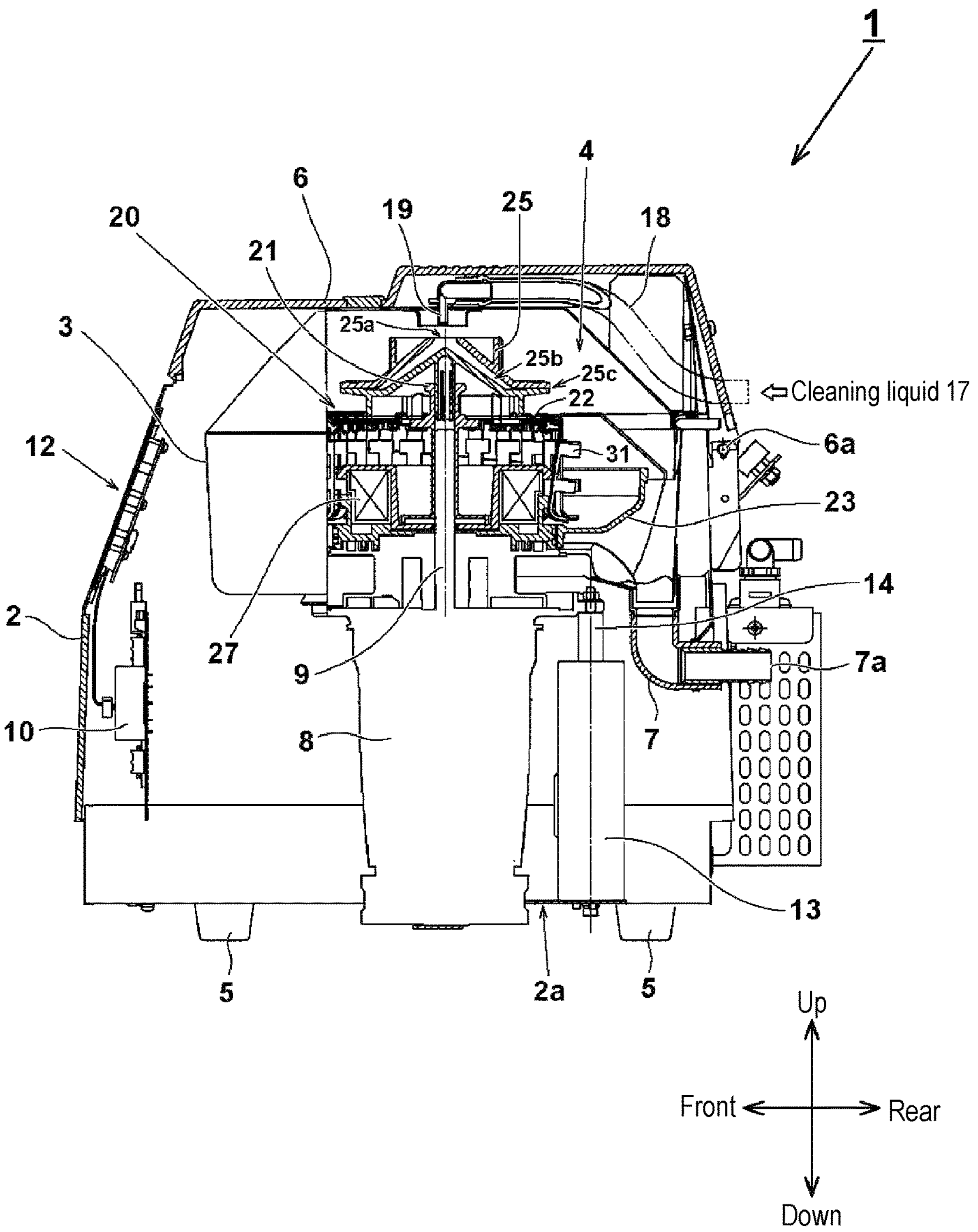
FIG. 1 is a vertical cross-sectional view showing an overall configuration of a centrifuge 1 according to the present invention.

FIG. 1 is a vertical cross-sectional view showing an overall configuration of a centrifuge 1 according to the present invention. The centrifuge 1 for cell washing has a housing (frame) 2 that has a rectangular cross-sectional shape when viewed from an upper surface, a door 6 that opens and closes an upper portion of the housing 2, and a chamber 3 arranged in the housing 2. The centrifuge 1 rotates a rotor 20 in the inside of the chamber 3 (a rotor chamber 4). The housing 2 has a plurality of leg portions 5 and is arranged on the floor or the like. The door 6 is an openable/closable door whose front side can agitate in a vertical direction with a hinge 6*a* arranged on the rear side as the center. A motor 8 having a drive shaft 9 is arranged below the chamber 3, and the rotor 20 is mounted on an upper end of the drive shaft 9. The motor 8 includes, for example, a brushless motor, and a rotation number (rotation speed) of the motor 8 can be controlled by a control device 10. A columnar column (pole) 13 is arranged so as to fix the motor 8 to a base portion 2*a* of the housing 2, and a rubber damper 14 for reducing vibration of the rotor 20 and the motor 8 is arranged between the motor 8 and the column 13. An operation display panel 12 constituted of a touch-type liquid crystal display panel or the like is arranged in a front side surface of the housing 2. The operation display panel 12 is a part for inputting information from a user, as well as a part for displaying information from the control device 10.

Figure 2:
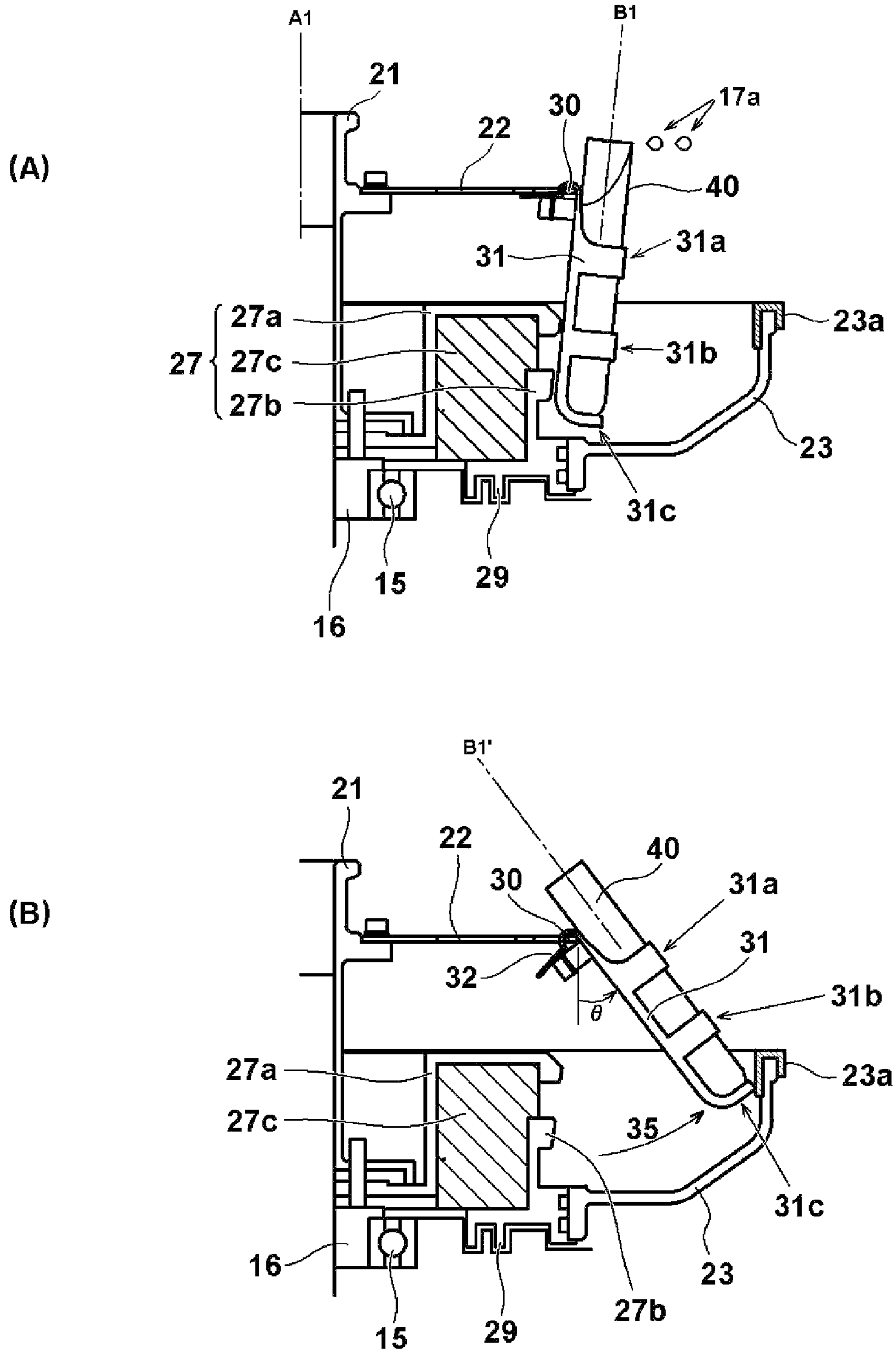
FIG. 2 shows partial vertical cross-sectional views of a rotor 20 of FIG. 1, in which (A) shows a state in which swinging of a test tube holder 31 is restricted, and (B) shows a state in which the swing of the test tube holder 31 is allowed and the test tube holder 31 swings in a direction of an arrow 35.

The rotor 20 is a dedicated rotor for washing cells, and has a plurality of (for example, 24) test tube holders 31 arranged side by side at equal intervals in a circumferential direction when viewed from the upper surface. The test tube holder 31 is held in a centrifugal direction (radial direction) in a swingable (rotatable) manner by pivoting an inner peripheral side surface by a rotor plate 22 (reference sign is shown in FIG. 2) of the rotor 20. The test tube holder 31 is constituted of a magnetic member, and holds a test tube 40 (see FIG. 2) by inserting the test tube 40 from the top to the bottom. A sample (liquid) containing living cells such as red blood cells or the like is previously placed inside each test tube 40 (not shown), and the test tube 40 containing the sample is set in each test tube holder 31 by hands of an operator before the start of centrifugal separation operation.

The rotor 20 includes a holding part 27 for holding a longitudinal central axis of the test tube holder 31 vertically or at a nearly vertical agitating angle. The holding part 27 keeps the metal test tube holders 31 in a non-swingable state by sucking the metal test tube holder 31 by a magnetic force, and uses a magnetic element such as an electromagnet or the like. The holding part 27 can electrically switch between a suction state (fixed state or non-swingable state) and a released state (swingable state) of the test tube holder 31. The holding part 27 functions as a so-called angle rotor having a negative swinging angle when the test tube holder 31 is in the suction state, and functions as a so-called swing rotor when the test tube holder 31 is in the released state. A swinging angle θ of the test tube in the released state is about 45 degrees, which is described later in FIG. 2.

The rotor 20 for cell washing is detachable with respect to the drive shaft 9. Therefore, the drive shaft 9 can also be equipped with a normal angle rotor or a normal swing rotor that cannot supply a cleaning liquid during the rotation. When the rotor 20 for cell washing as in the example is mounted on the drive shaft 9, a cleaning liquid distribution element 25 is mounted on an upper portion of the rotor 20, and a cleaning liquid supply pipe 18 arranged in the door 6 is used to supply a liquid such as cleaning liquid or the like into the test tube 40 described later in FIG. 2 during the rotation of the rotor 20 (during swinging). The cleaning liquid distribution element 25 is arranged on the rotor 20 so as to rotate integrally with the rotor 20 on which the test tube holders 31 in a circular row are mounted, and the cleaning liquid distribution element 25 is rotated integrally with the rotor 20.

A nozzle 19 serving as an outlet of the cleaning liquid supply pipe 18 is arranged on a rotation axis A1 at an upper portion of the cleaning liquid distribution element 25, and the liquid falling from the nozzle 19 flows into a cleaning liquid inflow port 25*a* located on the upper side of the cleaning liquid distribution element 25. The cleaning liquid inflow port 25*a* is on the rotation axis A1 at the upper portion and forms a space that is connected to a cleaning liquid passage 25*b* having a conical internal space. An outer edge portion of the cleaning liquid passage 25*b* is divided in the circumferential direction, and a plurality of cleaning liquid injection ports 25*c* extending in the radial direction (see FIG. 3(A) described later) are formed.

A pump (not shown) is coupled to an outer end portion (an end portion apart from the nozzle 19) of the cleaning liquid supply pipe 18 that supplies the cleaning liquid to the cleaning liquid distribution element 25. By turning on (ON) an operating power of the pump by the control device 10, a cleaning liquid 17 can be supplied from an external cleaning liquid tank (not shown) to the nozzle 19 located at the upper portion of the centrifuge 1 through the cleaning liquid supply pipe 18. In a cleaning liquid injection step described later, the cleaning liquid ejected downward from the nozzle 19 enters the central portion of the cleaning liquid distribution element 25 that rotates integrally with the rotor 20 at a high speed, is distributed to flow to the outer periphery by the centrifugal force in the cleaning liquid distribution element 25, is branched into each of flow paths having the same number (24) as that of the test tubes 40 held in the tube holders 31, and is vigorously injected into each test tube 40 from the cleaning liquid injection ports 25*c* of the cleaning liquid distribution element 25.

A bowl-shaped bottom surface portion 23 is formed at the lower portion of the rotor 20. The bottom surface portion 23 is a container for receiving the cleaning liquid spilled without entering the test tube 40 and also serves as a stopper for restricting the swinging angle of the test tube holder 31. That is, the test tube holder 31 that holds the test tube rotates in a radial horizontal direction of the circumference of the rotor 20 and tilts until the lower portion (a holding bottom portion 31*c* described later) of the test tube holder 31 contacts an outer edge portion of the bottom surface portion 23. In the contact state, the sample such as the blood cells or the like in the test tube 40 is centrifuged.

Because the cleaning liquid is injected in a state in which the rotor 20 is rotated and the excess cleaning liquid is discharged from the inside of the test tube 40, the spilled cleaning liquid is accumulated on a bottom surface portion of the chamber 3. Thus, a drain hose 7 is connected to a portion of the bottom surface of the chamber 3, and a discharge port 7*a* of the drain hose 7 is arranged extending to the outside of the housing 2. The user collects or discards the excess cleaning liquid (waste liquid) using a hose or the like at the front end of the discharge port 7*a*.

FIG. 2 are partial vertical cross-sectional views of the rotor 20 of FIG. 1, in which (A) shows a state in which the swinging of the test tube holder 31 is restricted by the holding part 27, and (B) shows a state in which the swing of the test tube holder 31 is allowed. Here, unlike FIG. 1, FIG. 2 shows a state in which the test tube 40 is mounted on the test tube holder 3. Both FIGS. 2(A) and 2(B) show the rotating state of the rotor 20. However, in the state of FIG. 2(A), the suction force (magnetic force) generated by the holding part 27 is stronger than the centrifugal force applied to the test tube holder 31, and thus the test tube holder 31 is maintained in the substantially vertical state. On the other hand, the state of FIG. 2(B) is after the suction by the holding part 27 is interrupted, and the suction force (magnetic force) does not act, and thus the test tube holder 31 swings in a direction of an arrow 35 by the centrifugal force.

The test tube holder 31 is a member that holds the test tube 40 made of glass or synthetic resin not to fall when the test tube 40 is stopped or when the centrifugal separation operation is performed. The test tube holder 31 is made of a magnetic material, for example, a stainless alloy that is sucked by a magnet made of SUS430 material. Holding insertion portions 31*a* and 31*b* are formed in the middle of a longitudinal direction of the test tube holder 31, and the holding bottom portion 31*c* that supports a bottom of the test tube 40 is formed at a lower end portion in the longitudinal direction. The holding insertion portions 31*a* and 31*b* are portions formed by bending a portion of a metal plate into a ring shape, and the holding bottom portion 31*c* is a portion that holds the bottom of the test tube 40 by bending a portion of the metal plate cut out by press working radially outward. Each test tube holder 31 is held on an outer peripheral edge of a circular shape holding portion (the rotor plate 22) in a state in which the test tube holder 31 can be swinged by a rotating shaft 30. A torsion spring 32 is arranged on the rotating shaft 30, and when an external force caused by the centrifugal force is not applied to the test tube holder 31, the test tube holder 31 is urged to move to a position shown in FIG. 2(A), that is, urged in a direction in which the test tube holder 31 abuts against the holding part 27.

The holding part 27 includes a magnetic element (electromagnet) that generates magnetism by electric power. The holding part 27 includes a disk-shaped upper magnetic member 27*a* and a lower magnetic member 27*b*, and is further constituted of a ring-shaped coil (magnetic coil) 27*c* of an insulated wire installed so as to be clamped between the upper magnetic member 27*a* and the lower magnetic member 27*b*. The holding part 27 is fixed to the rotor 20, thus rotating together with the rotor 20. In addition, when the rotor 20 is removed from the drive shaft 9, the holding part 27 is also removed. Wiring of the holding part 27 to the magnetic coil 27*c* is performed from the bottom surface side of the chamber 3 by a slip ring 16, and an electric current can be supplied to the magnetic coil 27*c* not only when the rotor 20 is stopped but also when the rotor 20 is rotating. The on or off of the electric current supply is controlled by the control device 10 that has a microcomputer. When the electric current is applied to the magnetic coil 27*c*, a strong magnetic force can be generated which passes through the upper magnetic member 27*a* and the lower magnetic member 27*b*. Because the test tube holder 31 is made of a magnetic material, the test tube holder 31 forms a magnetic circuit together with the upper magnetic member 27*a* and the lower magnetic member 27*b*. That is, by supplying the electric current to the magnetic coil 27*c*, the holding part 27 (the magnetic members 27*a* and 27*b*) acts as one magnet and sucks the test tube holder 31 made of the magnetic material.

An outer diameter of the upper magnetic member 27*a* is larger than that of the lower magnetic member 27*b*. Accordingly, the suction surfaces of the upper magnetic members 27*a* and lower magnetic member 27*b* can hold the test tube holder 31 in a state in which a bottom side of the test tube 40 is slightly tilted inward, in other words, an upper opening is slightly tilted radially outward (agitating angle θ=about −7 degrees) with respect to a vertical line (completely parallel to the rotation axis A1 of the rotor). A labyrinth portion 29 is formed on a bottom surface of the lower magnetic member 27*b* to limit flow of air between a bearing 15 and the rotor chamber 4.

FIG. 2(B) shows a state in which the rotor 20 is rotating at a high rotation number, and in this state, the test tube holder 31 holding the test tube 40 swings (agitates) in the direction of the arrow 35 by the centrifugal force around the rotating shaft 30 against the urging force of the torsion spring 32. The maximum value of the swinging angle θ is restricted by making the holding bottom portion 31C of the test tube holder 31 abut against the outer periphery of the cup like bottom surface portion 23. That is, an inner side outer edge wall 23*a* of the bottom surface portion 23 functions as a stopper in the swinging state of the test tube holder 31. When the test tube holder 31 swings, the ring-shaped coil 27*c* is not energized. When the test tube holder 31 swings significantly as shown in FIG. 2(B), the swinging amount is restricted by making the holding bottom portion 31*c* of the test tube holder 31 abut against the rubber inner side outer edge wall (stopper surface) 23*a*. Here, the agitating angle θ is about 45 degrees, and the centrifugal separation operation is performed in this state.

When the cleaning liquid injection step is performed using this swingable rotor 20, the test tube holder 31 rotates in the outer horizontal direction of the circular row by the centrifugal force generated by the rotation of the rotor 20. In the rotating state as shown in FIG. 2(B), the opening of the test tube 40 faces the rotation axis A1 side, and thus the cleaning liquid can be injected into the test tube 40 from the cleaning liquid injection port 25*c* (see FIG. 1) of the cleaning liquid distribution element 25 (see FIG. 1). As shown in FIG. 2(A), in a supernatant discharging step after the cleaning liquid injection step, excess supernatant 17*a* can be discharged from the test tube 40 to the outside by fixing the test tube holder 31 in a substantially vertical state using the holding part 27 and rotating the rotor 20.

(A) of FIG. 3 is a partial top view of the test tube holder 31 having the test tube 40 mounted thereon, (B) of FIG. 3 is a partial side view of the test tube holder 31 having the test tube 40 mounted thereon, and FIGS. 3(A) and 3(B) show a stationary state of the rotor 20 or a rotating state of the rotor 20 in a state in which the swinging of the test tube holder 31 is prevented. As shown in FIG. 3(A), a plurality of the test tube holders 31 are arranged side by side at equal intervals in the rotation direction. The test tubes 40 made of glass or synthetic resin are respectively mounted on the test tube holders 31. When the swinging of the test tube holder 31 is prevented, that is, when the test tube holder 31 is sucked by the holding part 27, the opening of the test tube 40 is slightly tilted toward the rotation axis A1 side of the rotor 20. In the inner peripheral side from the opening of the test tube 40, the cleaning liquid distribution element 25 is arranged and a passage extending from the cleaning liquid passage 25*b* to the plurality of cleaning liquid injection ports 25*c* are formed. The cleaning liquid injection port 25*c* is arranged corresponding to each test tube 40. When the rotor 20 is rotated at a fixed low speed, the cleaning liquid discharged from the cleaning liquid injection port 25*c* is injected into the opening of the test tube 40 by the centrifugal force and gravity. Thus, the opening of the cleaning liquid injection port 25*c* is arranged at a distance from the opening of the test tube 40 in the radial direction due to this positional relationship.

FIG. 3(B) is a side view of one test tube 40 and one test tube holder 31. In order to prevent the test tube 40 held by the test tube holder 31 from coming off during the centrifugal operation, the bottom of the test tube holder 31 is fixed by the holding bottom portion 31*c*, the ring-shaped holding insertion portion 31*a* is formed slightly above the substantially center of the test tube 40 in the axial direction, and the ring-shaped holding insertion portion 31*b* is formed between the ring-shaped holding insertion portion 31*a* and the holding bottom portion 31*c*. The holding insertion portions 31*a* and 31*b* and the holding bottom portion 31*c* are formed of an integral piece of magnetic metal. Here, a central axis B1 is held so as to coincide with the vertical direction along the rotation axis A1 of the rotor 20 in the side view. The lower magnetic member 27*b* of the holding part 27 is located below a spindle portion 21. Note that, although it is not clearly shown in FIG. 3, the inner peripheral side of the holding insertion portion 31*a* is in contact with the upper magnetic member 27*a*.

Next, an execution procedure of a cleaning cycle is described with reference to FIGS. 4 and 5. FIG. 4 is a time chart showing the rotation speed of the rotor 20 in the cleaning cycle. FIG. 5 is a diagram showing each process and each state of the test tube 40 in the cleaning cycle. First, at time 0 to time $t_1$, the motor 8 is started, and the rotor 20 is accelerated to a centrifugal separation rotation speed $R_3$. At this time, the test tube holder 31 can swing, that is, the test tube holder 31 is not sucked by the holding part 27 (see FIG. 2). When the swinging amount of the test tube holder 31 reaches maximum at a time shown by an arrow 38*a* during the acceleration of the rotor 20, the cleaning liquid is dropped downward from the cleaning liquid injection port 25*c* and is injected into the cleaning liquid distribution element 25 from the cleaning liquid inflow port 25*a*. The cleaning liquid that has entered the inside of the cleaning liquid distribution element 25 is supplied into the plurality of test tubes 40 from the upper opening of the swinging test tube 40 through the cleaning liquid passage 25*b*. An acceleration section (section of (1)) for supplying the cleaning liquid is the cleaning liquid injection step (WASH) shown by (1) in FIG. 5, and is shown in the column of (1) in FIG. 5. Specifically, in the cleaning liquid injection step (WASH), when the rotation speed of the rotor 20 reaches 1200 rpm, a certain amount of the cleaning liquid (for example, physiological saline) is sent to the cleaning liquid distribution element (distributor) 25 by the pump (not shown). The physiological saline is vigorously injected into each test tube 40 from the cleaning liquid distribution element 25 by the centrifugal force. At this time, the blood cells in the test tube 40 are sufficiently suspended with the physiological saline.

When the injection of the cleaning liquid is completed in the middle of the acceleration section and the rotation speed of the rotor 20 reaches the set rotation speed $R_3$ of the centrifugal separation operation at time $t_1$, the operation is performed for the set time (centrifugal separation operation time=$t_2-t_1$). Here, as shown in the column of (2) in FIG. 5, the excess cleaning liquid injected into the test tube 40 leaks out from the upper opening of the test tube 40 when the liquid level faces the perpendicular direction. In addition, the sample moves to the bottom in the cleaning liquid. In the centrifuging step of (2) in FIG. 4, when the time reaches time $t_2$, the motor 8 is decelerated to stop the rotation of the rotor 20.

When the rotation of the rotor 20 is stopped at time $t_3$ in FIG. 4, the supernatant discharging step indicated by (3) is performed. In the discharging step, the test tube holder 31 is sucked by energizing the ring-shaped coil 27*c* of the holding part 27 (see FIG. 2). With respect to the state of the test tube 40 at this time, as shown in the supernatant discharging step (DECANT) of (3) in FIG. 5, an opening portion 40*a* is tilted so as to face slightly outward so that the agitating angle becomes slightly negative. In this state, the rotor 20 is accelerated to a settling speed $R_2$, settled for a certain time, and then is decelerated. In this way, the rotor 20 is rotated in a state in which the agitating angle of the test tube 40 is slightly negative, and thereby the supernatant rises along the wall surface of the test tube 40 due to the centrifugal force and is discharged to the outside. Thus, most of the supernatant is discharged to the outside of the test tube 40.

An agitating step is performed after the rotor 20 is stopped at time $t_4$. The agitating step is a step of stirring the remaining cleaning liquid and the sample by agitating the test tube holder a plurality of times in a short time (AGITATE). Here, the rotation speed of the rotor 20 is accelerated to $R_1$, settled for a short time, and then decelerated immediately. The operation of repeating rotation and stop is performed a plurality of times (here, 5 times) in steps of acceleration, settling, and stop. As described above, the cleaning cycle from (1) to (4) is repeated a plurality of times, for example, about 3 to 4 times, and as shown in FIG. 5, an additional centrifuging step ("centrifugal separation 2") of (5) is performed after the agitating step ((4)) of the final cleaning cycle, and then the process is ended. In the step of (5), the rotor 20 is rotated for about several seconds.

FIG. 6 is a time chart showing the rotating state of the rotor 20 (rotating state of the motor 8) during the execution of the living cell washing process using the centrifuge of the embodiment when a blood transfusion test or the like is performed, and shows the overall operation described in FIGS. 4 and 5. In this example, a cleaning process including 3 cycles is performed. The cleaning liquid injection step ((1)), the centrifugal separation step ((2)), and the agitating step ((4)) in the first to third cycles each have the same drive pattern. The rotation speed ($R_3$) of the motor 8 set in the centrifugal separation step is 3,000 rpm, which is the same as that in other steps. The supernatant discharging step (first decanting operation shown by (3)-1) in the first and second cycles is as shown in FIG. 4, and the supernatant is discharged by rotating the rotor at a constant rotation speed ($R_2$=400 rpm) according to the operation pattern of "acceleration, settling, and deceleration". Here, the supernatant discharging step ((3)-1) is the same as the conventional control method in that the test tube holder 31 is sucked (the state shown in FIG. 2(B)) by keeping the ring-shaped coil 27*c* energized throughout the supernatant discharging step. On the other hand, the operation method of the final supernatant discharging step (here, the step of the third cycle indicated by (3)-2) is changed.

The supernatant discharging step shown in (3)-2 of the third cycle has the following four features. (1) During the operation of the rotor 20, the settling section is eliminated, and the operation pattern is set to "acceleration and deceleration" only. (2) The acceleration is started when the test tube holder 31 is sucked by the holding part 27, and the suction of the test tube holder 31 by the holding part 27 (see FIG. 2) is released at the intermediate stage until the end of acceleration ($R_2$=400 rpm is reached), that is, at a release timing 51 indicated by the arrow. (3) Because the fixing of the test tube holder 31 to the inner peripheral side is released after an arrow 51, the test tube holder 31 and the test tube 40 agitate by the centrifugal force from the position of the test tube 40 shown in FIG. 2(A) to the position of the test tube 40 shown in FIG. 2(B). (4) Acceleration is continued even after the state of (3), and as soon as the specified rotation speed, that is, $R_2$=400 rpm, is reached, the rotor 20 is decelerated to stop the rotation.

As a result of the above control, in the final supernatant discharging step (second decanting operation indicated by (3)-2), the discharge of the supernatant from the test tube 40 is interrupted during the acceleration (the timing indicated by the arrow 51). In the embodiment, after the supernatant discharging step ((3)-2), the amount of the cleaning liquid remaining in the test tube 40 can be precisely adjusted to a desired amount by adjusting the timing for releasing the test tube holder 31 (rotation speed of the arrow 51).

FIG. 7 is a diagram in which the portion of the supernatant discharging step (the portion from time $t_{13}$ to time $t_{15}$) shown in (3)-2 of FIG. 6 is extracted. At time $t_{13}$, when the rotor 20 is accelerated while the test tube holder 31 is sucked by the holding part 27, the energization of the ring-shaped coil 27*c* of the holding part 27 (see FIG. 2) is stopped at the predetermined release timing 51 shown at time $t_{14}$. Then, the magnetic force of the holding part 27 that functions as an electromagnet disappears, and thus the suction state of the test tube holder 31 to the holding part 27 is released. Although the test tube holder 31 is biased to the holding part 27 side by the torsion spring 32 (see FIG. 2), the centrifugal force is sufficiently larger than the force of the torsion spring 32 during the rotation of the rotor 20. Thus, the test tube holder 31 swings as shown by the arrow 35 in FIG. 2(B), and the holding bottom portion 31*c* of the test tube holder 31 abuts against the rubber inner side outer edge wall (stopper surface) 23*a*. Then, when the acceleration of the rotor 20 is continued, and the rotation speed reaches R2=400 rpm indicated by an arrow 53, the deceleration of the rotor 20 is started, and the rotor 20 is stopped at time $t_{15}$. As described above, in the embodiment, because the suction of the test tube holder 31 to the holding part 27 is released during the acceleration of the rotor 20 (the release timing 51), the cleaning liquid remaining in the test tube 40 at that time remains inside the test tube 40 as it is. Therefore, the amount of the cleaning liquid remaining inside the test tube 40 can be precisely controlled if the release timing 51 is set appropriately. Furthermore, the test tube holder 31 swings at the release timing 51, and the rotor 20 may be controlled to be decelerated as shown by a dotted line 55 at a timing at which the swinging state of the test tube holder 31 is settled down, for example, at a timing shown by an arrow 54 when a certain time has passed from the release timing 51.

If it is desired to increase the amount of the cleaning liquid remaining inside the test tube 40, the suction of the test tube holder 31 may be released at a timing earlier than the release timing 51, for example, at a timing 51*a*. If it is desired to reduce the amount of the cleaning liquid, the suction of the test tube holder 31 may be released at a timing later than the release timing 51, for example, at a timing 51*b*. The releasing of the suction of the test tube holder 31 can be achieved only by releasing the power supply to the ring-shaped coil 27*c*, and thus can be easily controlled by the control device 10. In this way, because the release timing 51 is assigned during the acceleration of the rotor 20, the amount of the residual cleaning liquid can be increased by shifting the release timing 51 toward the direction of an arrow 52*a* (advancing the release timing), and conversely, the amount of residual cleaning liquid can be reduced by shifting the release timing 51 toward the direction of an arrow 52*b* (delaying the release timing). The adjustment of the amount of the residual cleaning liquid according to the embodiment can also be freely specified by the user. For example, in a case that a standard release timing is 51, if the actual release timing is set to two stages (adjustment levels of the remaining amount +1 and +2) in the direction of the arrow 52*a*, and similarly, if the actual release timing is set to two stages (adjustment levels of the remaining amount −1 and −2) in the direction of the arrow 52*b*, the amount of the residual cleaning liquid can be set to a total of five stages. The setting level including these five stages may be configured to be settable by the user from the operation display panel 12. Note that, the number of stages that the release timing can be set is optional, and the release timing may be set continuously variably instead of being set in stages.

FIG. 8 is a flowchart showing an overall procedure of the living cell washing process according to the example when the blood transfusion test or the like is performed. First, before executing the steps of each cycle, the user sets the test tube 40 containing the living cells such as blood cells in the test tube holder 31 of the rotor, and inputs conditions (set temperature and set rotation speed) and the like of the centrifugal separation operation. In addition, the cleaning liquid 17 to be supplied to the cleaning liquid supply pipe 18 is prepared, and the user presses a start icon displayed on the operation display panel 12 when these preparations are completed. Then, the cleaning process shown in FIG. 8 is started. First, the control device 10 performs the cleaning liquid injection step of ① shown in FIG. 6 (time 0 to $t_1$ in FIG. 6). Here, the motor 8 that drives the rotor 20 is accelerated, the lower portion of the test tube holder 31 is rotated radially outward by the centrifugal force, and the test tube 40 is tilted at a constant angle from the substantially vertical direction to the vicinity of the horizontal direction. During the acceleration of the rotor 20, by turning on (ON) the pump (not shown), the control device 10 supplies the cleaning liquid 17 to the cleaning liquid supply pipe 18 and injects the cleaning liquid into the test tube 40 via the cleaning liquid distribution element 25, which rotates with the rotation of the rotor 20 (step 61). When a sufficient amount of the cleaning liquid is injected into the test tube 40, the control device 10 turns off the pump (not shown) and stops the injection of the cleaning liquid. In the test tube 40 into which the cleaning liquid has been injected, the living cells such as blood cells are stirred and washed by the force of the cleaning liquid injection.

When the injection of the cleaning liquid is completed and the rotation speed of the rotor 20 reaches the specified centrifugal rotation speed, the centrifuging step of ② is performed. In the centrifuging step, the operation is performed at a constant speed only for a time set according to the centrifugal rotation speed $R_3$. Here, for example, the rotation speed of the rotor 20 is set to 3000 rpm and the centrifugation is performed for 45 seconds. Accordingly, the blood cells precipitate at the bottom of the test tube 40, and unnecessary substances such as serum or the like remains in a supernatant state (step 62). Next, the control device 10 determines whether the performed centrifuging step is the final cycle of the plurality of cycles (step 63). Here, when the performed centrifuging step is not the final cycle, that is, when the centrifuging step is performed at time $t_3$ or time $t_8$ in FIG. 6, the "supernatant discharging step 1" is performed the same as that of the conventional centrifuge (step 64). Here, a magnetic field is generated when the energization of the magnetic coil 27*c* is turned on (ON), and the test tube holder 31 is sucked and fixed in a substantially vertical state. In the state that the test tube holder 31 is held substantially vertically in this way, the rotor 20 is accelerated and rotated at a constant speed for a short time after the rotation speed is settled to about 400 rpm, and then the rotor 20 is decelerated and stopped (step 64). Next, in the agitating step, by alternately repeating the rotation and the stop of the rotor 20 at intervals, or by alternately repeating forward rotation and reverse rotation at intervals, the test tube 40 in the test tube holder 31 is agitated, and the blood cells that had precipitated and stuck to the bottom of the test tube 40 are dissolved (step 65). Then, the process returns to step 61.

In step 63, because the cleaning operation performed at time $t_{13}$ is the final cycle among the three cycles, the "supernatant discharging step 2" according to the embodiment is performed in step 66. Here, a magnetic field is generated when the energization of the magnetic coil 27*c* is turned on (ON), and the test tube holder 31 is sucked and fixed in a substantially vertical state. In the state that the test tube holder 31 is held substantially vertically in this way, the rotor 20 is accelerated, and at an intermediate stage in which the rotation speed of the rotor 20 reaches the specified rotation speed of 400 rpm, that is, at the timing 51 of FIG. 7, the energization of the magnetic coil 27*c* is turned off and the magnetic field is extinguished. The arrival of the timing 51 can be precisely determined by the control device 10 according to the rotation speed of the motor 8. Although not shown in FIG. 1, the motor 8 of the centrifuge 1 is equipped with a rotation detecting part.

When the energization of the magnetic coil 27*c* is turned off during the acceleration of the rotor 20, the lower portion of the test tube 40 agitates radially outward by the centrifugal force. At this time, because the upper opening surface of the test tube 40 faces the inner peripheral side of the rotor 20, the outflow of the supernatant from the test tube 40 is prevented (step 66). Then, when the lower portion of the test tube 40 remains agitating outward in the radial direction of the rotor 20, and the rotation speed of the rotor 20 is continuously increased and reaches the specified rotation speed of 400 rpm, the control device 10 decelerates the rotor 20.

Next, in the agitating step, by alternately repeating the rotation and stop of the rotor 20 at intervals, or by alternately repeating forward rotation and reverse rotation at intervals, the control device 10 agitates the test tube 40 in the test tube holders 31, and he blood cells that had precipitated and stuck to the bottom of the test tube 40 are dissolved (step 67). Finally, because when the test tube 40 is taken out, water droplets and the like may be attached to an outer wall of the test tube 40, in order to drop the water droplets, the rotor 20 is accelerated to a rotation speed sufficient to drop the water droplets and then stopped. (step 68). By the acceleration and the deceleration in step 68, the blood cells precipitated in the test tube 40 can be positioned at the center of the bottom surface, and as a result, the precipitate is easily taken out from the test tube 40 after the operation is completed. The steps described above complete the cleaning process for performing the blood transfusion tests or the like.

Although the present invention has been described above based on the embodiment, the present invention is not limited to the above-mentioned embodiment, and various modifications can be made without departing from the spirit of the present invention. For example, in the supernatant discharging step of the embodiment described above, the amount of residual cleaning liquid is adjusted by releasing the holding state of the test tube holder during the acceleration and shifting the release timing back and forth. This may be controlled in a manner that the holding state of the test tube holder is released at the time of settling the supernatant discharging step performed in the order of “acceleration, settling, and deceleration”, and the rotation speed at the time of settling is increased or decreased according to the amount of the residual cleaning liquid. In addition, in the embodiment described above, the test tube holder 31 is released during acceleration only in the last cycle among the plurality of cycles, but the test tube holder 31 may also be released during the acceleration in the supernatant discharge step of all cycles.

What is claimed is:

1. A centrifuge, comprising:

a motor;

a rotor that is connected to a drive shaft of the motor and rotated by the motor;

a plurality of test tube holders that are arranged side by side in a circumferential direction of the rotor and are rotatable in a radial direction by a centrifugal force generated by the rotation of the rotor;

a cleaning liquid distribution element that is held in the rotor and supplies a cleaning liquid into a plurality of test tubes held by the test tube holders;

a holding part capable of preventing the rotation of the test tube holders; and a control device for controlling rotation of the motor and operation of the holding part, wherein, the control device performs the following steps: a cleaning liquid injection step of injecting the cleaning liquid into the test tubes by the cleaning liquid distribution element during the rotation of the rotor; a centrifuging step of rotating the test tube holders by the centrifugal force generated by the rotation of the rotor; and a supernatant discharging step of rotating the rotor in a state in which the test tube holders are held by the holding part and discharging the supernatant of the cleaning liquid from the test tubes, and in the supernatant discharging step, during the rotation of the rotor, the test tube holders are made to swing by releasing the test tube holders held by the holding part from the holding state, wherein a remaining amount of the cleaning liquid in the test tubes is adjusted according to a timing for releasing from the holding state.

2. The centrifuge according to claim 1, wherein the supernatant discharging step performed by the control device comprises control of acceleration, settling, and deceleration of the rotor, and when the holding of the test tube holders by the holding part is released during the acceleration of the rotor, the rotation of the rotor is subsequently controlled to be decelerated without being settled.

3. The centrifuge according to claim 2, wherein the control device releases the test tube holders from the holding state during the acceleration of the rotor.

4. The centrifuge according to claim 2, wherein the control device adjusts an amount of the cleaning liquid remaining in the test tubes when the holding of the test tube holders are released during acceleration of the rotor according to the rotation speed of the rotor when the holding of the test tube holders are released.

5. The centrifuge according to claim 4, wherein the control device releases the test tube holders from the holding state during the acceleration of the rotor.

6. The centrifuge according to claim 4, wherein the holding part comprises an electromagnet, and the control device prevents the rotation of the test tube holders by attracting the test tube holders comprising a magnetic material by the electromagnet.

7. The centrifuge according to claim 6, wherein the control device releases the test tube holders from the holding state during the acceleration of the rotor.

8. The centrifuge according to claim 6, wherein the rotor has a stopper that restricts an agitating angle of the test tube holders with respect to the drive shaft during the centrifugation.

9. The centrifuge according to claim 8, wherein the control device releases the test tube holders from the holding state during the acceleration of the rotor.

10. The centrifuge according to claim 1, wherein the control device releases the test tube holders from the holding state is during the acceleration of the rotor.

11. A centrifuge, comprising:

a rotor rotated by a motor; a cleaning liquid distribution element that injects a cleaning liquid into a test tube mounted on the rotor during the rotation of the rotor; an agitating angle changing part that is capable of switching the agitating angle of the test tube with respect to the rotor; and a control device for controlling the rotation of the motor, the injection of the cleaning liquid, and the change of the agitating angle, wherein the control device performs a first decanting operation by rotating the rotor in the order of acceleration, settling, and deceleration in a state in which the agitating angle of the test tube is restricted, and discharging the supernatant of the cleaning liquid from the test tube, and performs, after the first decanting operation, a second decanting operation by accelerating the rotor, releasing restriction on the agitating angle during the acceleration, and then decelerating the rotor.

12. The centrifuge according to claim 11, wherein the second decanting operation is an operation that does not comprise the settling of the rotor.

13. The centrifuge according to claim 12, wherein an amount of the cleaning liquid remaining in the test tube after the second decanting operation is adjusted according to a timing for switching the agitating angle during the acceleration of the rotor.

14. The centrifuge according to claim 13, wherein a switching timing of the agitating angle during the second decanting operation can be set in advance by a user.

15. A centrifuge, comprising:

a motor;

a rotor that is connected to a drive shaft of the motor and rotated by the motor;

a plurality of test tube holders that are arranged side by side in a circumferential direction of the rotor and are rotatable in a radial direction by a centrifugal force generated by the rotation of the rotor;

a cleaning liquid distribution element that is held in the rotor and supplies a cleaning liquid into a plurality of test tubes held by the test tube holders;

a holding part capable of preventing the rotation of the test tube holders; and a control device for controlling rotation of the motor and operation of the holding part, wherein, the control device performs the following steps:

a cleaning liquid injection step of injecting the cleaning liquid into the test tubes by the cleaning liquid distribution element during the rotation of the rotor;

a centrifuging step of rotating the test tube holders by the centrifugal force generated by the rotation of the rotor; and a supernatant discharging step of rotating the rotor again, after the centrifugation step is completed and the rotor is stopped, in a state in which the test tube holders are held by the holding part and discharging the supernatant of the cleaning liquid from the test tubes, and in the supernatant discharging step, during the rotation from the rotor starts to when the rotor stops, the test tube holders are made to swing by releasing the test tube holders held by the holding part from the holding state.

* * * * *